United States Patent
Xiong et al.

(10) Patent No.: US 11,824,621 B2
(45) Date of Patent: Nov. 21, 2023

(54) FREQUENCY CONTROL

(71) Applicant: Nokia Technologies Oy, Espoo (FI)

(72) Inventors: Zhilan Xiong, Bristol (GB); Matthew Baker, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/761,247

(22) PCT Filed: Sep. 21, 2020

(86) PCT No.: PCT/FI2020/050605
§ 371 (c)(1),
(2) Date: Mar. 17, 2022

(87) PCT Pub. No.: WO2021/064284
PCT Pub. Date: Apr. 8, 2021

(65) Prior Publication Data
US 2022/0368412 A1 Nov. 17, 2022

Related U.S. Application Data

(60) Provisional application No. 62/910,654, filed on Oct. 4, 2019.

(51) Int. Cl.
*H04B 7/185* (2006.01)
*H04B 7/01* (2006.01)
*H04B 7/026* (2017.01)

(52) U.S. Cl.
CPC .......... *H04B 7/18513* (2013.01); *H04B 7/01* (2013.01); *H04B 7/026* (2013.01)

(58) Field of Classification Search
CPC ...... H04B 7/18513; H04B 7/01; H04B 7/026; H04B 7/2125; H04B 7/0617; H04B 7/0408; H04B 7/2041; H04W 56/0035
See application file for complete search history.

(56) References Cited

U.S. PATENT DOCUMENTS

2016/0309434 A1\* 10/2016 Regev ................... H04L 43/106
2018/0083719 A1 3/2018 Kim et al.
(Continued)

FOREIGN PATENT DOCUMENTS

EP 2490389 A1 8/2012
EP 3447936 A1 2/2019
(Continued)

OTHER PUBLICATIONS

"3rd Generation Partnership Project; Technical Specification Group Radio Access Network; NR; Physical layer procedures for control (Release 15)", 3GPP TS 38.213, V15.6.0, Jun. 2019, pp. 1-107.
(Continued)

*Primary Examiner* — Minh Trang T Nguyen
(74) *Attorney, Agent, or Firm* — Harrington & Smith (57) ABSTRACT

According to an example aspect of the present invention, there is provided an apparatus comprising at least one processing core, at least one memory including computer program code, the at least one memory and the computer program code being configured to, with the at least one processing core, cause the apparatus at least to receive, from a first beam, information concerning frequency adjustment of a second beam, the second beam being different from the first beam, and apply the information when synchronizing with the second beam, and/or in transmitting to the second beam in an uplink transmission.

16 Claims, 8 Drawing Sheets

(56) References Cited

U.S. PATENT DOCUMENTS

2020/0154298 A1* 5/2020 Axén ............... H04W 24/10
2020/0196263 A1* 6/2020 Heyn ............... H04W 56/0005

FOREIGN PATENT DOCUMENTS

| WO | 2016/153265 A1 | 9/2016 |
| WO | 2018/127481 A1 | 7/2018 |
| WO | 2020/200396 A1 | 10/2020 |

OTHER PUBLICATIONS

"3rd Generation Partnership Project; Technical Specification Group Radio Access Network; NR; Physical layer procedures for data (Release 15)", 3GPP TS 38.214, V15.6.0, Jun. 2019, pp. 1-105.

"3rd Generation Partnership Project; Technical Specification Group Radio Access Network; NR; Medium Access Control (MAC) protocol specification (Release 15)", 3GPP TS 38.321, V15.6.0, Jun. 2019, pp. 1-78.

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.

"3rd Generation Partnership Project; Technical Specification Group Radio Access Network; Study on New Radio (NR) to support non-terrestrial networks (Release 15)", 3GPP TR 38.811, V15.1.0, Jun. 2019, pp. 1-126.

"3rd Generation Partnership Project; Technical Specification Group Radio Access Network; Solutions for NR to support non terrestrial networks (NTN) (Release 16)", 3GPP TR 38.821, V0.7.0, May 2019, pp. 1-86.

International Search Report and Written Opinion received for corresponding Patent Cooperation Treaty Application No. PCT/FI2020/050605, dated Dec. 4, 2020, 14 pages.

"Considerations on Doppler Compensation, Uplink Timing Advance and Random Access in NTN", 3GPP TSG RAN 8 WG1 Meeting #98, R1-1908250, Agenda : 7.2.5.3, Nokia, Aug. 26-30, 2019, pp. 1-21.

* cited by examiner

FREQUENCY CONTROL

RELATED APPLICATION

This application was originally filed as PCT Application No. PCT/FI2020/050605, filed on Sep. 21, 2020, which claims priority from U.S. Provisional Application No. 62/910,654, filed on Oct. 4, 2019, each of which is incorporated herein by reference in its entirety.

FIELD

The present disclosure pertains to wireless communication.

BACKGROUND

The Doppler shift is a change in frequency and wavelength of a wave in relation to an observer who is moving relative to the wave source. The shift is, in general, proportional to speed of movement and to the frequency being emitted. Doppler shifts find application in various fields as they enable determining a speed of movement of various objects, including aircraft and astronomical objects.

In wireless communication, Doppler shifts affect the way electromagnetic waves are received, for example, a base station will experience an un-shifted frequency from a user equipment, UE, which is stationary but a shifted frequency from a UE which is in a car, and an even more shifted frequency from a UE in a high-speed train.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to receive, from a first beam, information concerning frequency adjustment of a second beam, the second beam being different from the first beam, and apply the information when synchronizing with the second beam, and/or in transmitting to the second beam in an uplink transmission.

According to a second aspect of the present disclosure, there is provided an apparatus comprising at least one processing core, at least one memory including computer program code, the at least one memory and the computer program code being configured to, with the at least one processing core, cause the apparatus at least to transmit, via a first beam, information concerning a frequency adjustment of a second beam, different from the first beam.

According to a third aspect of the present disclosure, there is provided a method, comprising receiving, from a first beam, information concerning a frequency adjustment of a second beam, the second beam being different from the first beam, and applying the information when synchronizing with the second beam, and/or in transmitting to the second beam in an uplink transmission.

According to a fourth aspect of the present disclosure, there is provided a method comprising transmitting, via a first beam, information concerning a frequency adjustment of a second beam, different from the first beam.

According to a fifth aspect of the present disclosure, there is provided an apparatus comprising means for receiving, from a first beam, information concerning a frequency of a second beam, the second beam being different from the first beam, and applying the information when synchronizing with the second beam, and/or in transmitting to the second beam in an uplink transmission.

According to a sixth aspect of the present disclosure, there is provided an apparatus comprising means for transmitting, via a first beam, information concerning a frequency adjustment of a second beam, the second beam being different from the first beam.

According to a seventh aspect of the present disclosure, there is provided a non-transitory computer readable medium having stored thereon a set of computer readable instructions that, when executed by at least one processor, cause an apparatus to at least receive, from a first beam, information concerning a frequency adjustment of a second beam, the second beam being different from the first beam, and apply the information when synchronizing with the second beam, and/or in transmitting to the second beam in an uplink transmission.

According to an eighth aspect of the present disclosure, there is provided a non-transitory computer readable medium having stored thereon a set of computer readable instructions that, when executed by at least one processor, cause an apparatus to at least transmit, via a first beam, information concerning a frequency adjustment of a second beam, the second beam being different from the first beam.

Further aspects comprise computer programs configured to cause methods in accordance with the foregoing aspects to be performed, when run.

EMBODIMENTS

This disclosure relates to procedures for compensating for Doppler shifts in wireless communication, for example in non-terrestrial or multipoint networks. Non-terrestrial networks are cellular networks where cells, or beams, are controlled by at least one satellite in orbit about the Earth. In other words, in these cases the uplink is from a UE on the ground to one satellite in orbit, and the downlink is from the same or a different satellite to the UE on the ground. Information concerning a frequency adjustment of a second beam, or plural beams including a second beam and a third beam, may be received from a satellite at a UE over a first beam. This information may be used in synchronizing to the second beam, and/or downlink measurement/receiving of the second beam by receiving downlink transmission of the second beam. Alternatively or in addition, the information may be used in transmitting in the uplink to the second beam.

Figure 1:
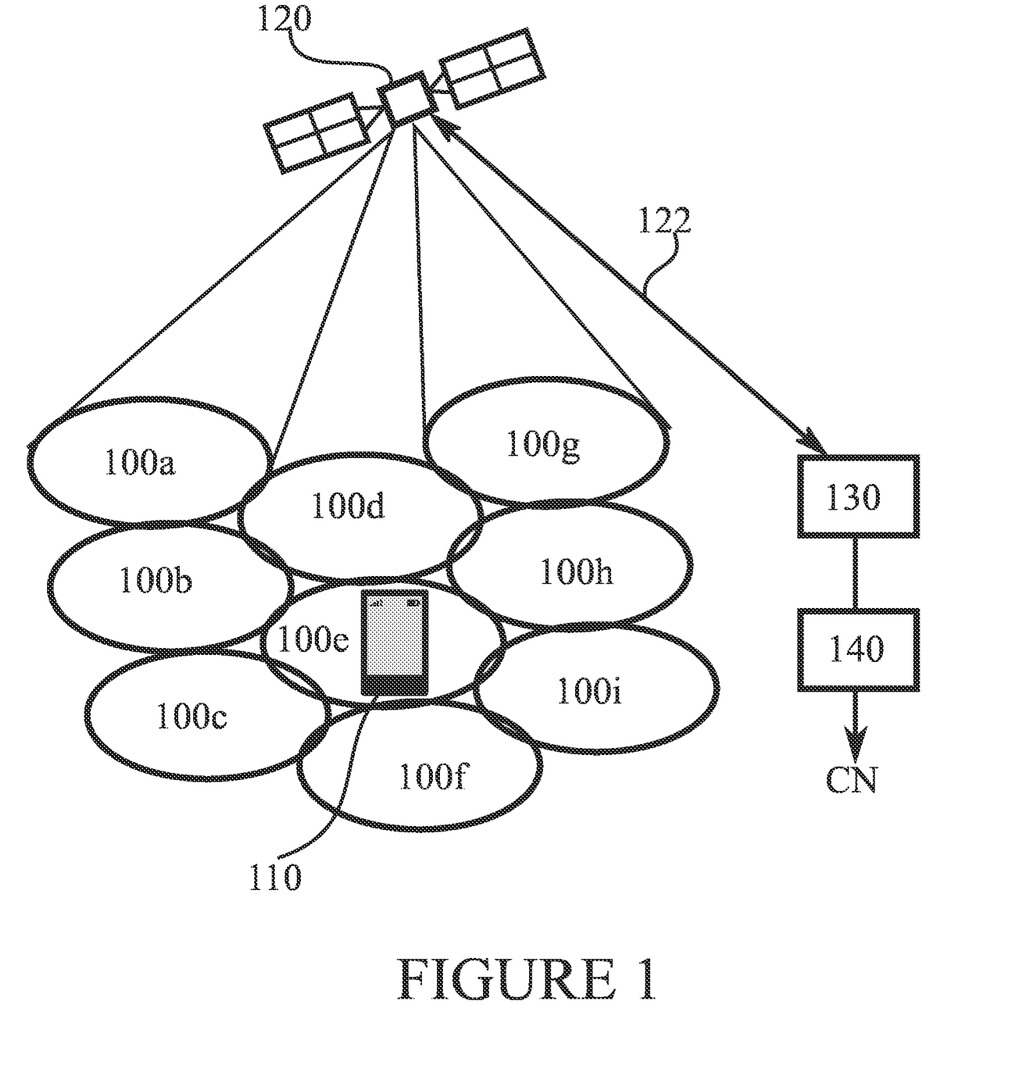
FIG. 1 illustrates an example non-terrestrial system in accordance with at least some embodiments of the present invention.

FIG. 1 illustrates non-terrestrial system in accordance with at least some embodiments of the present invention. A satellite 120, for example of a satellite constellation, is configured to provide multiple beams 100a-100i. Each beam may correspond to a cell, or a cell may comprise plural beams, depending on the configuration. Where satellite 120 is not geostationary, for example in case it is in low-Earth orbit, LEO, the beams will move with respect to the surface of the Earth and a UE 110 communicating with the non-terrestrial network will need to switch beams it uses as the beams move over it, to enable a stable connection to the satellite constellation.

Satellites of the constellation may be enabled to communicate with each other, for example via directional microwave or laser links, and/or they may each be configured to directly link to a ground station 130 via link 122. Ground station 130 may be connected with a gateway 140 to a core network, for example a core network of a cellular system, such that the cells offered by satellite 120 via beams 110a-110i may be visible in the cellular system as beams of the system.

The cellular system may be based on fifth generation, 5G, technology, as specified by $3^{rd}$ generation partnership project, 3GPP. 5G technology is also known as New Radio, NR. Other cellular technologies applicable may include long term evolution, LTE, or subsequent generations, such as sixth generation, 6G. While described herein primarily with reference to a non-terrestrial satellite network, principles laid out herein are applicable to other kinds of cellular or non-cellular networks as well, where these are Doppler constrained. Examples of non-cellular networks include wireless local area network, WLAN, and worldwide interoperability for microwave access, WiMAX.

In a low-Earth orbit, LEO, constellation, at a 600 km altitude in the downlink direction a Doppler shift may amount to +/−48 kHz at a 2 GHz carrier frequency, and +/−480 kHz for a 20 GHz carrier frequency. In the uplink, the overall shift may be +/−96 kHz for the 2 GHz carrier and +/−1200 kHz for a 30 GHz uplink carrier frequency used with 20 GHz in the downlink. Cellular standards have not been designed to account for Doppler shift of this magnitude, as the baseline scenario has been the terrestrial case where base stations are immobile on the ground. Therefore methods to compensate for the Doppler shift may be employed. For example, where a Doppler shift is determined to be +500 Hz, a transmission may be adjusted by lowering its frequency by 500 Hz, such that the signal will, after the shifting, arrive at the intended receiver at the intended frequency. Over all, higher Doppler shifts may cause longer acquisition times for initial access and beam or cell reselection in non-terrestrial networks, NTN, since the frequency shift needs to be estimated and corrected. This may degrade the quality of communication and cause time gaps in coverage, causing reduced communication capacity.

Figure 2A:
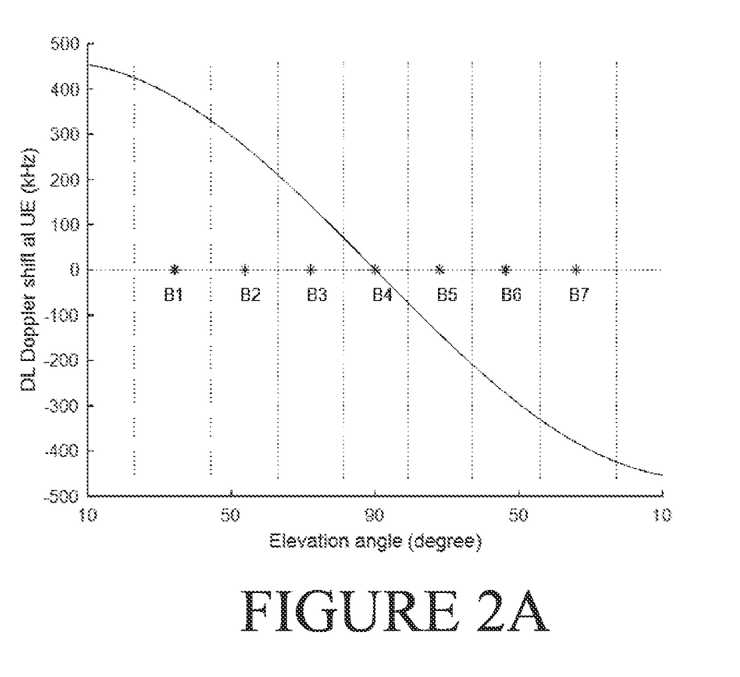
FIG. 2A illustrates an example of non-terrestrial Doppler shift without compensation in the downlink.

FIG. 2A illustrates an example of non-terrestrial Doppler shift without compensation in the downlink. In the example of FIG. 2A, a downlink carrier frequency of 20 GHz is used. The Doppler shift ranges from +480 kHz to −480 kHz as a function of elevation. Schematically, beams B1-B7 are indicated in the figure at differing elevation angles. As can be seen, the Doppler shift differs strongly between the beams.

Figure 2B:
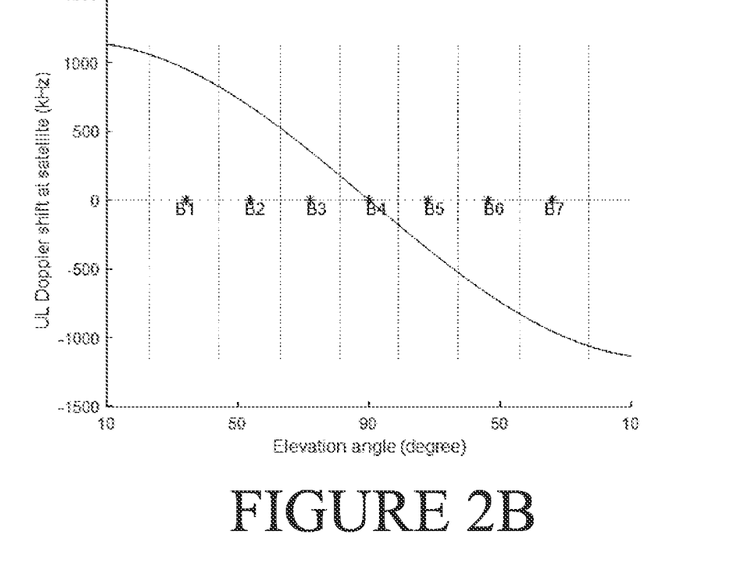
FIG. 2B illustrates an example of non-terrestrial Doppler shift without compensation in the uplink.

FIG. 2B illustrates an example of non-terrestrial Doppler shift without compensation in the uplink. A 20 GHz downlink carrier is used here in combination with a 30 GHz uplink carrier. As can be seen, the Doppler shift ranges from +1200 kHz to −1200 kHz. The shift is larger than in the downlink, as the UE will receive the downlink the satellite transmits in shifted form, and the UE's response will be shifted as well. Thus the uplink incurs two Doppler shifts and a larger overall shift.

A potential solution for Doppler compensation in NTN is beam-specific frequency pre-compensation in the downlink and post-compensation in the uplink at the network side due to the known satellite orbit and satellite beam centre point. In this solution, remaining differential frequency offset observed by fixed UE corresponding to its geographical beam can be controlled to within ±72 kHz in downlink and ±150 kHz in uplink for the geographical coverage area of each satellite beam as shown in if the downlink carrier frequency is 20 GHz and the uplink carrier frequency is 30 GHz. There is remaining Doppler shift, since the pre-compensation works optimally only for the beam centre point. The geographical beam of one UE is the beam where this UE is geographically located. This Doppler shift is acceptable for downlink synchronization in a cellular system.

Figure 3A:
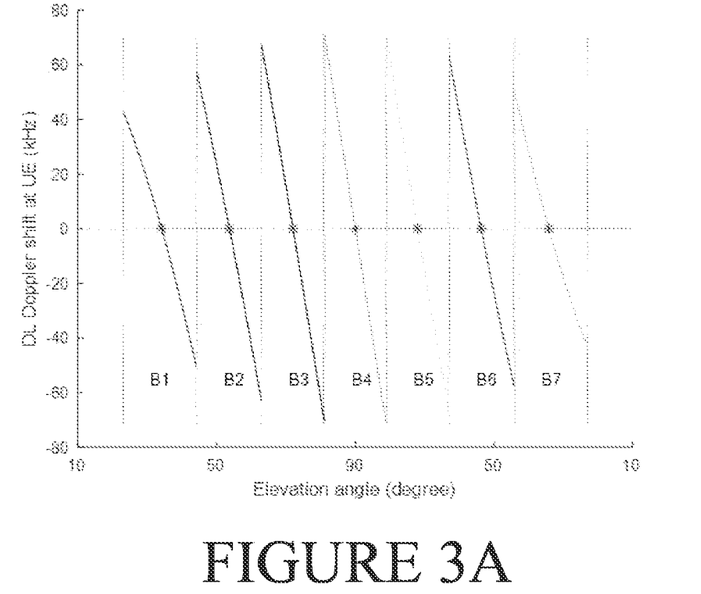
FIG. 3A illustrates an example of non-terrestrial Doppler shift with compensation in the downlink.
Figure 3B:
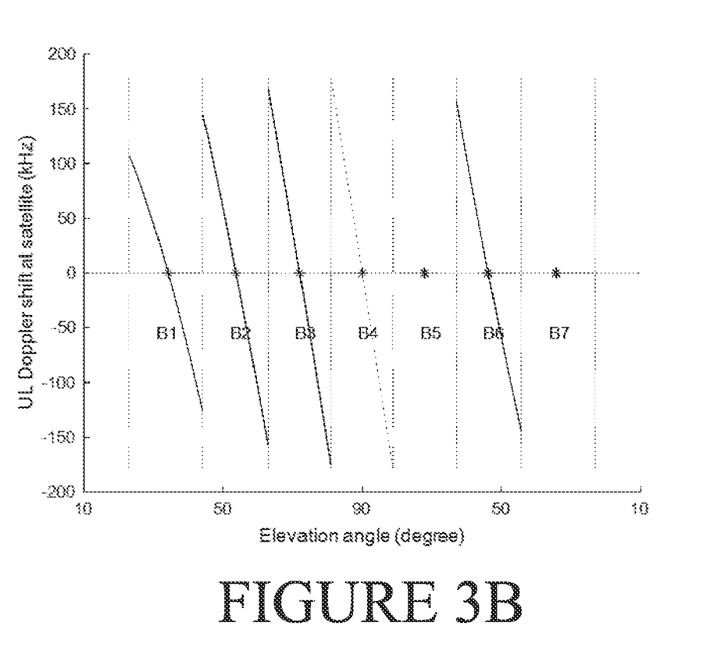
FIG. 3B illustrates an example of non-terrestrial Doppler shift with compensation in the uplink.
Figure 4A:
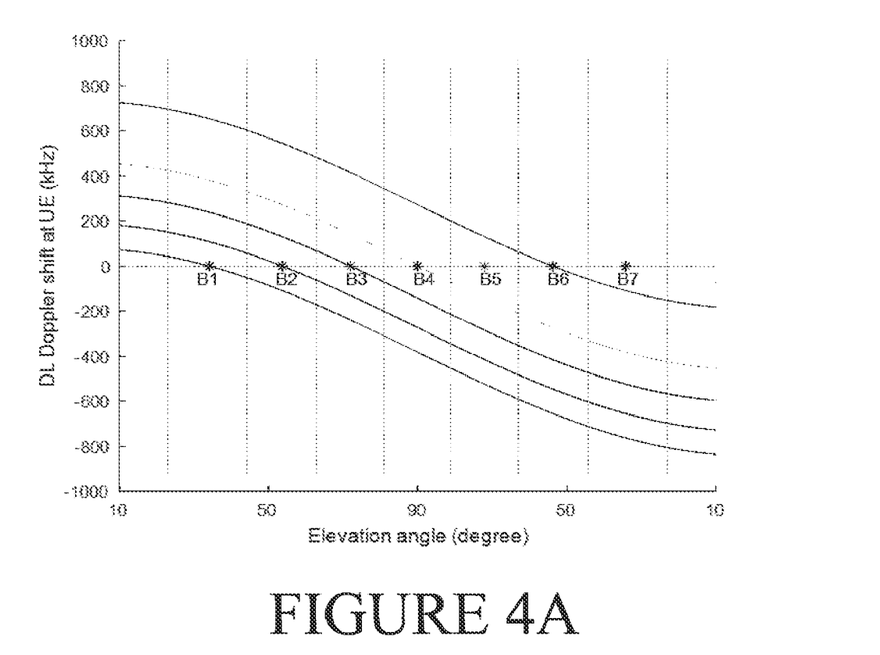
FIG. 4A illustrates an example of non-terrestrial Doppler shift with compensation in the downlink for a non-geographical beam set.
Figure 4B:
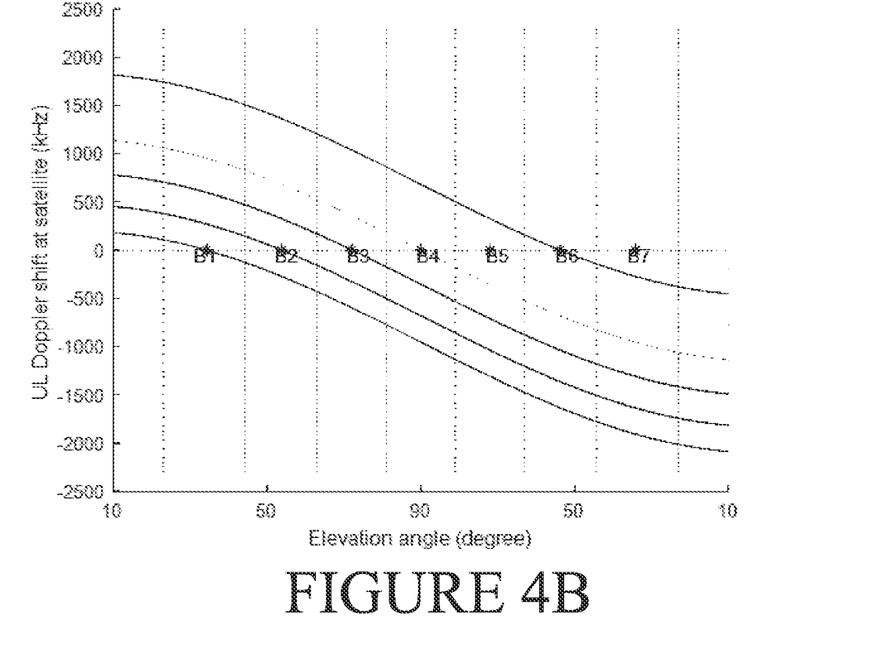
FIG. 4B illustrates an example of non-terrestrial Doppler shift with compensation in the uplink for a non-geographical beam set.

FIG. 3A illustrates an example of non-terrestrial Doppler shift with compensation in the downlink, and FIG. 3B illustrates an example of non-terrestrial Doppler shift with compensation in the uplink. As can be seen, compared to FIGS. 2A and 2B, the magnitude of the shift can be reduced significantly with pre-compensation. While the pre-compensation is usable in geographical beams, in non-geographical beams the remaining Doppler shift may be in the range of +/−800 kHz in the downlink and +/−2100 kHz in the uplink. This is illustrated in FIGS. 4A and 4B, where remaining Doppler shift in non-geographical beams is illustrated.

A geographical beam in the context of the present disclosure may be seen as a beam with geographically limited coverage area, for example, where the coverage area corresponds in one dimension to at most 15 degrees in elevation, to at most 20 degrees in elevation or to at most 25 degrees in elevation. A non-geographical beam, on the other hand, may have a coverage area corresponding in one dimension to at least 90 degrees in elevation, at least 120 degrees in elevation or at least 150 degrees in elevation. For example, the geographical beam may be at most 20 degrees and the non-geographical beam at least 150 degrees in size.

As a consequence, for downlink measurement/receiving at the UE side for neighbouring beams, this UE may have difficulty in quickly switching to a neighbouring beam from its serving beam. Further, for uplink measurement/receiving at the network side for one UE located to the geographical coverage of serving beam of this UE, the network may have difficulty in measuring or receiving uplink signalling from this UE by the neighbouring beams of this UE. To compensate for Doppler shift, UE positioning information and satellite positioning information may be employed. However, this solution is unable to solve the Doppler shift of neighbouring beam, because the neighbouring beam's carrier frequency has been changed at the network side to pre-compensate for Doppler shift, and it is not directly related to UE positioning information and satellite positioning information.

The present disclosure describes mechanisms for quick downlink frequency synchronization to neighbouring cells, beams or points to support downlink measurements and/or downlink/uplink transmission from neighbouring cells for network access, as well as handover or multi-point transmission in NTN or other networks having similar issues. As part of downlink frequency synchronization, a UE may adjust an internal clock.

Further, the present disclosure describes mechanisms for uplink frequency compensation at the UE side for its neighbouring cells, beams or points to support uplink measurement and receiving of neighbouring beams for network access, as well as for handover or multi-point transmission in NTN or other networks having similar issues.

In detail, a first beam may send at least one of the following information elements a) and/or b) to UE 110 by broadcast signalling or UE-specific signalling for network access, downlink measurement, and/or uplink transmission to at least one second beam. The first beam may be the serving beam. Information elements a) and b) are examples of information concerning a frequency adjustment of one or more beams, such as adjustment of carrier frequency of the one or more beams. The information concerning a frequency adjustment of one or more beams may comprise beam-specific information on frequency of the specific beam.

a) a search range of frequency, such as carrier frequency and b) indication of frequency(ies) of one or more beams, for example carrier frequency(ies). The frequency can be indicated by a common frequency offset corresponding to a given carrier frequency, a differential frequency offset relative to a common frequency offset of the first beam, or indicated beam, a frequency adjustment factor corresponding to the downlink carrier frequency of this first beam or indicated beam. Additionally or alternatively, with the consideration of different carrier frequencies due to frequency reuse factor being in excess of one, the indication of detailed carrier frequencies, for example sub-band index, of neighbouring beam(s) might be used depending on the detailed design.

The differential frequency offset may correspond to an offset of the neighbouring beam with respect to the first beam. For example, the system may indicate one, two or three beams and their offsets to the first beam. This information may be received over the first beam. The offset is useful, since the UE has already synchronized to the first beam and knows its frequency, as received in the receiver of the UE. Thus the offsets are usable in discovering the frequency (or frequencies) of the other beam (or beams) as received in the receiver of the UE.

For the uplink direction, compensation for multi-beam transmission or measurement may comprise that the first beam sends information to the UE by broadcast signalling or UE-specific signalling. This is usable for network access, handover, UL measurement and/or UL transmission to its neighbouring beam(s). The information may comprise an indication of carrier frequency(ies) of one or more beam(s) for uplink transmission of these cells. In detail, the indication may comprise a common frequency offset corresponding to given/known carrier frequency, a differential frequency offset relative to the common frequency offset of this serving or indicated beam, a frequency adjustment factor corresponding to the downlink carrier frequency of this serving or indicated beam and/or a frequency adjustment factor corresponding to the uplink carrier frequency of this serving or indicated beam. Additionally, with the consideration of different carrier frequencies due to frequency reuse factor exceeding one, an indication of detailed carrier frequencies, for example using sub-band index, of neighbouring beam(s) may be used.

Uplink frequency adjustment at the UE side for non-serving beam(s) aims to control the uplink Doppler shift at the network receiver side to within an acceptable range the receiver can handle. Alternatively, this adjustment may aim to control uplink Doppler shift at the network side to be the same as its serving beam. Alternatively, instead of the serving beam, the shift may be matched with the geographical beam and/or the indicated/given beams for better coverage.

If the UE is able to compensate the residual uplink Doppler shift of transmissions from this UE to its serving beam, then the residual uplink Doppler shift of the uplink signalling from its UE to its neighbouring beam can be compensated as well based on same method. In this method, the uplink Doppler shift of the uplink signalling from this UE to its serving beam and the uplink Doppler shift of the uplink signalling from this UE to its neighbouring beam are same even after beam-specific Doppler compensation is used at the satellite side for both downlink and uplink.

In general, the serving cell can be a serving beam. A satellite cell may be a satellite beam and/or a satellite point. A neighbouring cell may be neighbouring beam and/or neighbouring point.

In general, the Doppler compensation information for the first beam in the uplink direction may be used for the Doppler compensation for the neighbouring beam together with the solutions described herein for the uplink direction as additional Doppler compensation information, and the Doppler compensation information for the first beam in the downlink direction may be used for the Doppler compensation for the neighbouring beam together with the solutions described herein for the downlink direction as additional Doppler compensation information In general, the downlink differential frequency offset between $f_{Rx,UE,DL,i}$ and $f_{Rx,UE,DL,j}$ may be derived from $$\Delta_{DL,i,j} = \frac{X^{point,j} - X^{point,i}}{1 + X^{point,j}} f_{DL}^{ref}$$

where $X^{point,i}$ is the parameter related to Beam # i, $X^{point,j}$ is the parameter related to Beam # j and $f_{DL}^{ref}$ is the reference DL carrier frequency. The DL carrier frequency at UE side for Beam # j can be obtained by the DL carrier frequency at UE side for Beam # i and the differential frequency offset between Beam # i and Beam # j.

$$f_{Rx,UE,DL,j} = f_{Rx,UE,DL,i} - \Delta_{DL,i,j}$$

Alternatively to the differential frequency offset, a Common frequency offset corresponding to given/known carrier frequency may be signalled. In this case, the downlink carrier frequency at UE side for Beam # j can be obtained by a common frequency offset corresponding to given/known carrier frequency so that $$f_{Rx,UE,DL,j} = f_{given} - \Delta_{DL,given,j},$$

where $$\Delta_{DL,given,j} = \frac{X^{point,j} - X^{point,given}}{1 + X^{point,j}} f_{DL}^{ref}$$

In the uplink, a frequency offset for UL carrier frequency adjustment of neighbouring beams can be based on (tracked) DL frequency offset of neighbouring beam (for example Beam # j) $f_{UE,DL,j}$, $\Delta_{UL,i,j}$ and $f_{DL}^{ref}$ and $f_{UL}^{ref}$, where $$f_{UE,UL,j} = f_{UE,DL,j} - f_{DL}^{ref} + f_{UL}^{ref} - \Delta_{UL,i,j}$$

and $$\Delta_{UL,i,j} = \left(X^{point,i} - X^{point,j}\right)\left(\frac{f_{DL}^{ref}}{1 + X^{point,j}} + \frac{f_{UL}^{ref}}{X^{point,i}}\right)$$

In some cases, the UE might not be requested to track the downlink carrier frequency of Beam # j to simplify the process, or to save time and the power at the UE side. In this case, $$f_{UE,UL,j} = f_{UE,DL,i} - \Delta_{DL,i,j} - f_{DL}^{ref} + f_{UL}^{ref} - \Delta_{UL,i,j}$$

where the network can send the information related to $\Delta_{DL,i,j} + \Delta_{UL,i,j} - f_{DL}^{ref} + f_{UL}^{ref}$ directly. Note, that $f_{UE,UL,j} = f_{UE,DL,j} \ast f_{UL}^{ref} / f_{DL}^{ref} - \Delta_{UL,i,j}$, where the calculation method of $\Delta_{UL,i,j}$ may be adjusted accordingly.

Figure 5A:
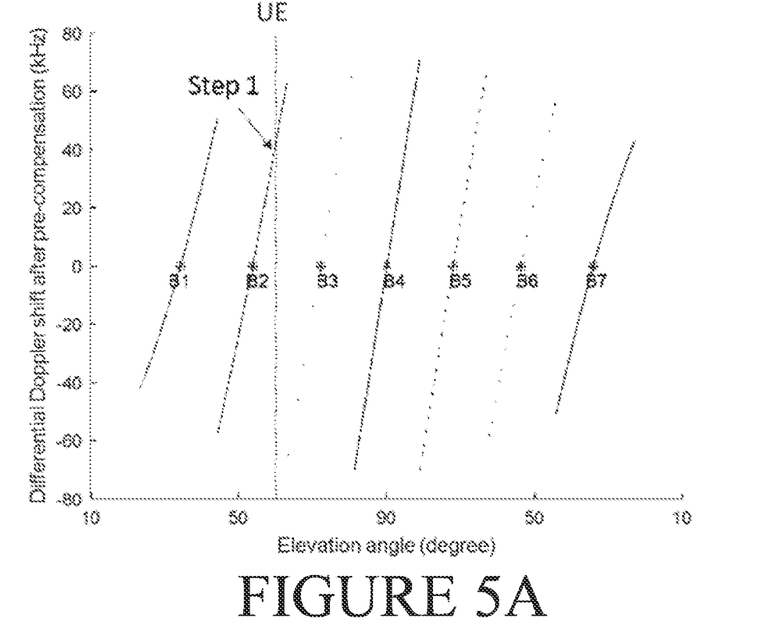
FIG. 5A illustrates a first phase in a method in accordance with at least some embodiments of the present invention.

FIG. 5A illustrates a first phase in a method in accordance with at least some embodiments of the present invention. Here the elevation angle of the UE is 60 degrees, and the UE is geographically located in Beam # 2. In a first phase, "Step 1", the UE tries to access an NTN and synchronizes with Beam # 2 within one short time due to beam-specific frequency offset pre-compensation at the satellite side, as shown in FIG. 3A.

Figure 5B:
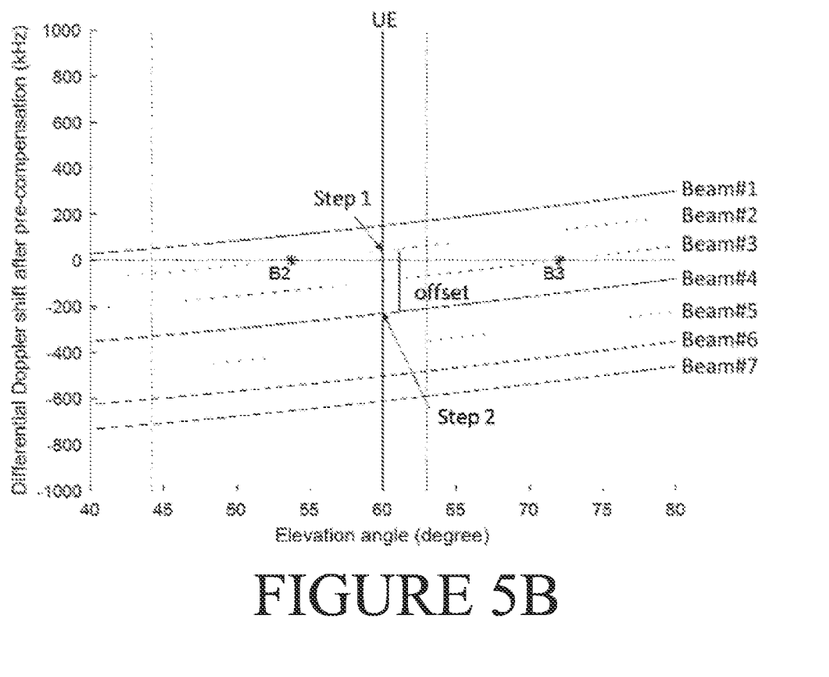
FIG. 5B illustrates a second phase in a method in accordance with at least some embodiments of the present invention.

FIG. 5B illustrates a second phase in a method in accordance with at least some embodiments of the present invention. In a second phase, "Step 2", the UE receives a differential common frequency offset of Beam # 4, and synchronizes with Beam # 4 by tracking carrier frequency of Beam # 2+differential common frequency offset of Beam # 4. This means, that $$f_{UE,DL,4} = f_{UE,DL,2} - \Delta_{DL,2,4}$$

where $$\Delta_{DL,2,4} = \frac{X^{point,4} - X^{point,2}}{1 + X^{point,4}} f_{DL}^{ref}$$

As an alternative to the second phase of FIG. 5B, the UE may receive the downlink frequency adjustment factor for Beam # 4, and synchronize with Beam # 4 by tracked downlink carrier frequency of Beam # 2 and the received downlink frequency adjustment factor of Beam # 4, for example $$f_{UE,DL,4} = (1 + \Delta_{DL,4,2}) \cdot f_{UE,DL,2}$$

where $f_{UE,DL,2}$ is tracked downlink carrier frequency of Beam # 2, $\Delta_{4,2}$ is DL frequency adjustment factor of Beam # 4 corresponding to Beam # 2, $f_{UE,DL,4}$ is derived DL carrier frequency of Beam # 4.

Figure 6:
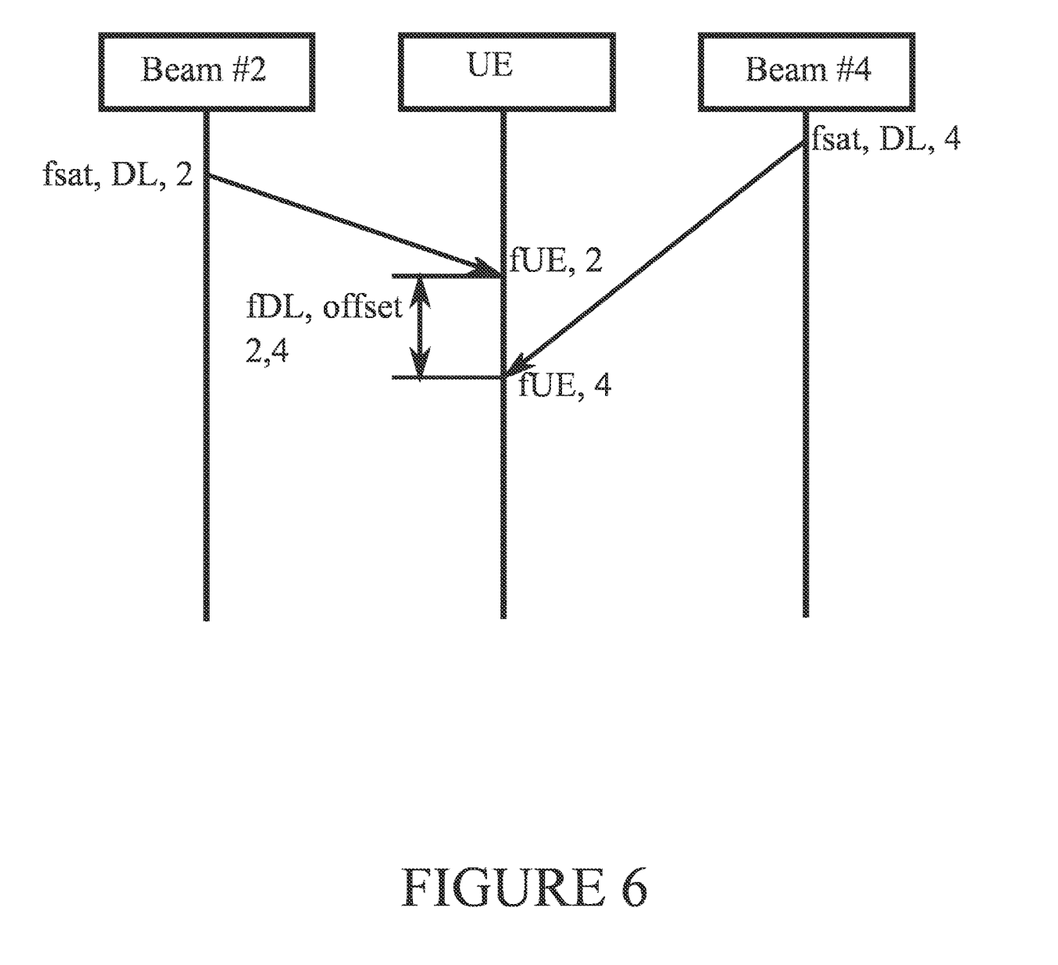
FIG. 6 illustrates frequency correction graphically in accordance with at least some embodiments of the present invention.

FIG. 6 illustrates frequency correction graphically in accordance with at least some embodiments of the present invention. Beam 2 and Beam 4 are transmitted from the network at frequencies $f_{sat,DL,2}$ and $f_{sat,DL,4}$, respectively. These transmissions are received in the UE in the downlink at frequencies $f_{UE,DL,2}$ and $f_{UE,DL,4}$, respectively. The offset defines the difference between the received frequencies in the downlink.

Correspondingly to FIGS. 5A, 5B and 6 but for the uplink direction,

Doppler shift may be corrected as follows. First, UE tries to access NTN and synchronizes with Beam # 2. Second, Beam # 2 becomes the serving beam of this UE. Third, Beam # 2 sends the information related to $\Delta_{DL,2,4}$ and $\Delta_{UL,2,4}$ so that UE can adjust its UL carrier frequency for the UL transmission to Beam # 4.

$$\Delta_{DL,2,4} = \frac{X^{point,4} - X^{point,2}}{1 + X^{point,4}} f_{DL}^{ref}, \text{ and}$$

$$\Delta_{DL,2,4} = \left(X^{point,2} - X^{point,4}\right)\left(\frac{f_{DL}^{ref}}{1 + X^{point,4}} + \frac{f_{UL}^{ref}}{X^{point,2}}\right)$$

Fourth, The UE may obtain the DL carrier frequency for Beam # 4 by $$f_{UE,DL,3} = f_{UE,DL,2} - \Delta_{DL,2,4}$$

and the UL carrier frequency for Beam # 4 by $$f_{UE,UL,4} = f_{UE,DL,4} - f_{DL}^{ref} + f_{UL}^{ref} - \Delta_{UL,2,4}$$

$f_{UE,DL,4}$ for UL carrier frequency derivation above can be based on the calculated $f_{UE,DL,4}$ or tracked $f_{UE,DL,4}$ after calculation. The network can send the corresponding indication for UE about how to get $f_{UE,UL,4}$.

Fifth, the UE sends UL data/signalling to Beam # 4. Finally, Beam # 2 receives the UL data/signalling from the UE because the UL Doppler shift of the UL signalling/data from this UE to Beam # 2 and the UL Doppler shift of the UL signalling/data from this UE to Beam # 4 are same. Since Beam # 2 is the serving beam of the UE, the satellite is able to receive the UL signalling from this UE to Beam # 4 as well.

In another case for the uplink direction, Doppler shift may be corrected as follows. First, UE tries to access NTN and synchronizes with Beam # 2. Second, Beam # 2 becomes the serving beam of this UE. Third, Beam # 2 sends the information related to $\Delta_{DL,2,4}$ and $\Delta_{UL,2,4}$ so that UE can adjust its UL carrier frequency for the UL transmission to Beam # 4.

$$\Delta_{DL,2,4} = \frac{X^{point,4} - X^{point,2}}{1 + X^{point,4}} f_{DL}^{ref}, \text{ and}$$

$$\Delta_{DL,2,4} = \left(X^{point,2} - X^{point,4}\right)\left(\frac{f_{DL}^{ref}}{1 + X^{point,4}} + \frac{f_{UL}^{ref}}{X^{point,2}}\right)$$

Fourth, the UE may obtain the DL carrier frequency for Beam # 4 by $$f_{UE,DL,4} = f_{UE,DL,2} - \Delta_{DL,2,4}$$

and the UL carrier frequency for Beam # 4 by $$f_{UE,UL,4} = f_{UE,DL,4} - f_{DL}^{ref} + f_{UL}^{ref} - \Delta_{UL,2,4} - \Delta_{UL,4,2,2}$$

$f_{UE,DL,4}$ for UL carrier frequency derivation above can be based on the calculated $f_{UE,DL,4}$ or tracked $f_{UE,DL,4}$ after calculation. $\Delta_{UL,4,2,2}$ is the UL Doppler compensation at this UE side for its uplink transmission to Beam # 2. The network can send the corresponding indication for UE about how to get $f_{UE,UL,4}$.

Fifth, the UE sends UL data/signalling to Beam # 4. Finally, Beam # 2 receives the UL data/signalling from the UE because the UL Doppler shift of the UL signalling/data from this UE to Beam # 2 and the UL Doppler shift of the UL signalling/data from this UE to Beam # 4 are same. Since Beam # 2 is the serving beam of the UE, the satellite is able to receive the UL signalling from this UE to Beam # 4 as well.

In a first implementation example, downlink Doppler compensation for initial access is discussed. During initial access, after searching the available serving cell, the UE detects master information block, MIB, and other system information blocks, SIBs, from one satellite cell. In order to support the UE to find a better satellite cell, this satellite cell sends or broadcasts the information on the differential carrier frequency offset(s) of its neighbouring cell(s) to this UE. This UE detects synchronization sequence(s) of neighbouring cells based on received differential carrier frequency offset(s) and finds better one(s) for network access.

In a second implementation example, uplink Doppler compensation for initial access is discussed. Based on the first implementation example, the satellite cell also can send or broadcast the information of the uplink Doppler compensation information above to the UE so that the UE can access the network by neighbouring beams since uplink transmission will be needed as well.

In a third implementation example, received signal received power, RSRP, measurement is discussed. In existing solutions, the network may configure a UE to measure RSRP based on synchronization signal/physical broadcast channel, SS/PBCH, and/or channel state information reference signal, CSI-RS, by radio resource configuration, RRC, configuration. In order to shorten searching time, the network can send the information on the differential carrier frequency offset(s) of given cells to the UE together with other RSRP measurement/reporting configuration information.

In a fourth implementation example, handover is discussed. In prior solutions for handover, the network sends UE the information of target serving cell including carrier frequency information. In the proposed enhanced solutions, the network also sends UE at least one of following information: differential carrier frequency offset between source serving cell and target serving cell for downlink transmission, common carrier frequency offset of target serving cell with the assumptions of common carrier frequency offset of source serving cell is available at the UE side for DL transmission, and uplink carrier frequency adjustment information of source serving cell corresponding to target serving cell.

In a fifth implementation example, multi-point transmission is discussed. The solutions in this disclosure may also support multi-point transmission, for example the network can inform the UE of the frequency adjustment for downlink or uplink transmission or measurement of neighbouring cells. Alternatively to cells, beams or points may be applicable, depending on the system.

Thus, in different implementation examples, a UE may use received information concerning frequency adjustment for a variety of purposes, including, but not limited to, measuring a received power of a second beam, handing over to a second beam, receiving data from a second beam, or transmitting data to a second beam.

Figure 7:
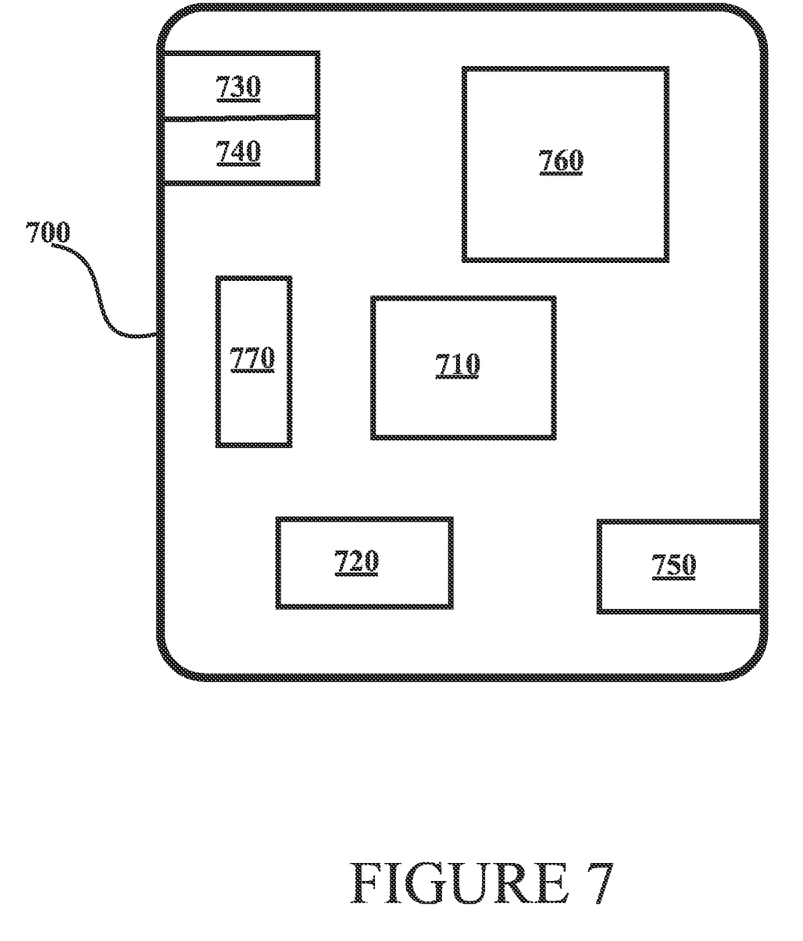
FIG. 7 illustrates an example apparatus capable of supporting at least some embodiments of the present invention.

FIG. 7 illustrates an example apparatus capable of supporting at least some embodiments of the present invention. Illustrated is device 700, which may comprise, for example, a mobile communication device such as mobile 110 of FIG. 1. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. Processor 710 may comprise at least one application-specific integrated circuit, ASIC. Processor 710 may comprise at least one field-programmable gate array, FPGA. Processor 710 may be means for performing method steps, such as receiving and applying, in device 700. Processor 710 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise computer instructions that processor 710 is configured to execute. When computer instructions configured to cause processor 710 to perform certain actions are stored in memory 720, and device 700 overall is configured to run under the direction of processor 710 using computer instructions from memory 720, processor 710 and/or its at least one processing core may be considered to be configured to perform said certain actions. Memory 720 may be at least in part comprised in processor 710. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 700 may comprise a near-field communication, NFC, transceiver 750. NFC transceiver 750 may support at least one NFC technology, such as NFC, Bluetooth, Wibree or similar technologies.

Device 700 may comprise user interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 730 and receiver 740, or via NFC transceiver 750, and/or to play games.

Device 700 may comprise or be arranged to accept a user identity module 770. User identity module 770 may comprise, for example, a subscriber identity module, SIM, card installable in device 700. A user identity module 770 may comprise information identifying a subscription of a user of device 700. A user identity module 770 may comprise cryptographic information usable to verify the identity of a user of device 700 and/or to facilitate encryption of communicated information and billing of the user of device 700 for communication effected via device 700.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 700, from other devices comprised in device 700. Such a receiver may comprise a serial bus receiver arranged to, for example, receive information via at least one electrical lead from receiver 740 for processing in processor 710. Alternatively to a serial bus, the receiver may comprise a parallel bus receiver.

Device 700 may comprise further devices not illustrated in FIG. 7. For example, where device 700 comprises a smartphone, it may comprise at least one digital camera. Some devices 700 may comprise a back-facing camera and a front-facing camera, wherein the back-facing camera may be intended for digital photography and the front-facing camera for video telephony. Device 700 may comprise a fingerprint sensor arranged to authenticate, at least in part, a user of device 700. In some embodiments, device 700 lacks at least one device described above. For example, some devices 700 may lack a NFC transceiver 750 and/or user identity module 770.

Processor 710, memory 720, transmitter 730, receiver 740, NFC transceiver 750, UI 760 and/or user identity module 770 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected without departing from the scope of the present invention.

Figure 8:
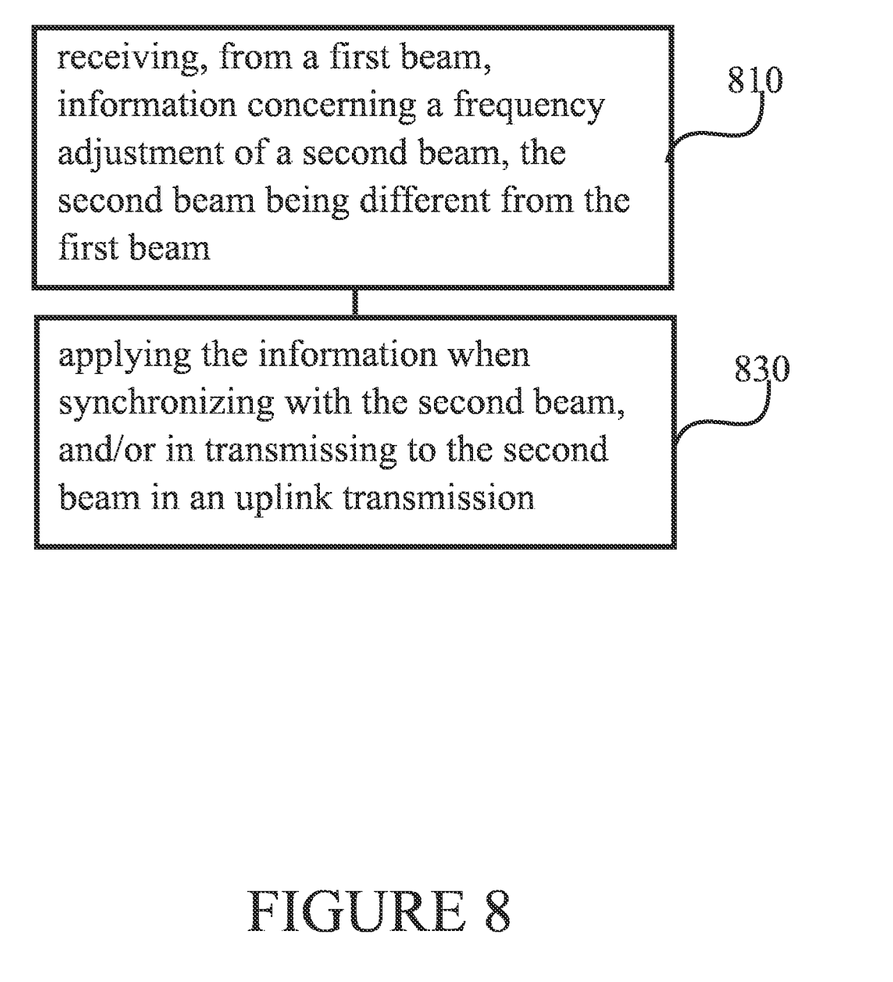
FIG. 8 is a flow graph of a method in accordance with at least some embodiments of the present invention.

FIG. 8 is a flow graph of a method in accordance with at least some embodiments of the present invention. The phases of the illustrated method may be performed in UE 110, an auxiliary device or a personal computer, for example, or in a control device configured to control the functioning thereof, when installed therein.

Phase 810 comprises receiving, from a first beam, information concerning a frequency adjustment of a second beam, the second beam being different from the first beam. Phase 820 comprises applying the information when synchronizing with the second beam, and/or in transmitting to the second beam in an uplink transmission. Phase 810 may take place after initial access, when the UE is in active mode toward the network. The indication of at least one frequency may comprise at least one beam-specific frequency offset to a frequency of the first beam. The first beam may be the serving beam.

Overall, the herein disclosed embodiments may provide simple and effective methods for multi-beam frequency synchronization to support initial access, measurement processes, downlink and/or uplink transmission of multi-beams, handover and multi-point transmission in NTN or networks having similar issues.

The proposed solutions can work with the solution of common frequency offset pre-compensation at the satellite side It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing wireless communication frequency aspects.

The invention claimed is:

1. An apparatus comprising:
   at least one processing core, and
   at least one memory,
   the at least one memory storing instructions, that when executed by the at least one processing core, cause the apparatus at least to:
   receive, from a first beam of a multi-point transmission network of a non-terrestrial network, information concerning frequency adjustment of a second beam of the multi-point transmission network, the second beam being different from the first beam; and
   apply the information when at least one of synchronizing with the second beam, or transmitting to the second beam in an uplink transmission.

2. The apparatus according to claim 1, wherein the first beam and the second beam are non-terrestrial beams controlled by at least one satellite orbiting the Earth.

3. The apparatus according to claim 1, wherein the applying of the information comprises at least one of adjusting the frequency of a clock in the apparatus according to the frequency adjustment information or setting the frequency of the uplink transmission according to the frequency adjustment information.

4. The apparatus according to claim 1, wherein the received information is at least one of a function of Doppler shift compensated carrier frequency of the first beam or a function of the Doppler shift compensated carrier frequency of the second beam.

5. The apparatus according to claim 1, wherein the received information is a function of a reference point of the first beam on the Earth's surface.

6. The apparatus of claim 1, wherein the received information is a function of orbital parameters of a satellite constellation controlling the first beam and the second beam.

7. A method, comprising:
   receiving, from a first beam of a multi-point transmission network of a non-terrestrial network, information concerning a frequency adjustment of a second beam, the second beam being different from the first beam; and
   apply the information when at least one of synchronizing with the second beam of the multi-point transmission network, or in transmitting to the second beam in an uplink transmission.

8. The method according to claim 7, wherein the first beam and the second beam are non-terrestrial beams controlled by at least one satellite orbiting the Earth.

9. The method according to claim 7, wherein the applying of the information comprises at least one of adjusting the frequency of a clock according to the frequency adjustment information or setting the frequency of the uplink transmission according to the frequency adjustment information.

10. The method according to claim 9, further comprising using the information concerning frequency adjustment for at least one of measuring a received power of a second beam, handing over to a second beam, receiving data from a second beam, or transmitting data to a second beam.

11. The method according to claim 7, wherein the received information is at least one of a function of Doppler shift compensated carrier frequency of the first beam or a function of the Doppler shift compensated carrier frequency of the second beam.

12. The method according to claim 7, wherein the received information is a function of a reference point of the first beam on the Earth's surface.

13. The method according to claim 7, wherein the received information is a function of orbital parameters of a satellite constellation controlling the first beam and the second beam.

14. An apparatus comprising:
    at least one processing core, and
    at least one memory,
    the at least one memory storing instructions, that when executed by the at least one processing core, cause the apparatus at least to:
    transmit, via a first beam of a multi-point transmission network of a non-terrestrial network, information concerning a frequency adjustment of a second beam of the multi-point transmission network, the second beam being different from the first beam.

15. The apparatus according to claim 14, wherein the transmitted information is at least one of a function of Doppler shift compensated carrier frequency of the first beam or a function of the Doppler shift compensated carrier frequency of the second beam.

16. The apparatus according to claim 14, wherein the transmitted information concerning frequency adjustment comprises at least one of the following: at least one common frequency offset, at least one differential frequency offset, at least one frequency adjustment factor, and at least one search range for carrier frequency.

* * * * *